Patented June 9, 1936

2,043,657

UNITED STATES PATENT OFFICE 2,043,657

COSMETIC PREPARATION

Victoria Goncarova, New York, N. Y.

No Drawing. Application December 8, 1934,
Serial No. 756,681

2 Claims. (Cl. 167—90)

This invention relates to an improved cosmetic preparation and, more particularly, to a novel facial preparation.

A feature of the invention resides in the provision of such a preparation which is easy to apply, effective in use and substantially invisible when applied, so that it may be left on the face during the daytime.

Another feature resides in the provision of a process for preparing such a cosmetic.

More specifically, I have found that certain fractions of albumen, especially raw albumen from the fresh whites of eggs, may be incorporated as the active ingredient of a facial cosmetic, and that when prepared in accordance with the present invention, it is stable over periods of time usually encountered in marketing and ordinary use.

By way of illustrating the invention, I set forth the following specific example of one preferred form of the invention. I prefer to take the fresh whites of eggs, carefully separated from the yolks, and press or filter them, without beating, through a cloth filter, which is advantageously composed of silk overlaid with a thin layer of cotton, an average closely woven grade of silk of medium texture and thickness being satisfactory. Certain portions of the albumen thus seep through the filtering material and form a filtrate which is treated as hereafter described, while other portions of the albumen remain on the filter.

I am unable to identify chemically the portions of the albumen which are thus separated out, but I have found that certain objectionable portions of the albumen may thus be removed. If desired, the filtrate may be repassed through the filter or through other filters a number of times. I have found that good results are obtained when the filtrate is repeatedly filtered, five or six times.

To three parts, by weight, of the albuminous material produced in this fashion I prefer to add about one part, by weight, of rose water or the like, which appears to have a preliminary stabilizing effect upon the albumen. The resulting mixture is stirred thoroughly, preferably in a glass container by means of a glass rod, in order not to introduce any foreign substance which might affect the stability of the albumen. The mixture is then allowed to stand for a period of time, 24 hours being satisfactory. Thereafter, there is added to the mixture about one and a half parts, by weight, of pure grain alcohol (95%) which has been diluted with about ⅓ its volume of water.

In combining the mixture of alcohol and water with the albumen, it is desirable to pour it in slowly, for instance drop by drop, and, at the same time, to stir the mixture continuously and rapidly. The water employed should be sterile, inasmuch as certain impurities may affect the albumen. The purpose of adding water is to dilute the alcohol sufficiently to prevent precipitation of albumen and also to avoid turning it brown. The dilution should not be carried to the point where the preservative effect of the alcohol on the albumen is lost. If desired, about 1% of an extract of bay leaves, or the like, may also be added, as well as an amount of rose water about equal to the amount previously added to the albumen.

The resulting composition is allowed to stand for several days, three days being usually enough, and is then again filtered through silk with or without a layer of cotton laid over it. This last filtrate constitutes the product, but it should be allowed to stand in closed containers for some time, say three weeks, before use. It is a smooth, homogeneous, greyish appearing liquid.

I have found that such composition spreads smoothly over the skin and does not show. It appears to have a softening and smoothing effect upon the skin and possibly also a slight astringent action. Its tendency is to make the flesh appear more youthful, fresh and firm. As mentioned, the preparation when spread thinly over the skin is not noticeable and, therefore, the preparation may be left on the face day and night thus obviating the disadvantages of mud packs and the like.

While I am unable to mention the chemical or physiological theories underlying the action of certain fractions of egg albumen in combination with alcohol of the general strength indicated, I have found that excellent results are secured by the preparation prepared as described. Although I prefer to employ the filterable portions of fresh egg albumen, I may employ like albumen when the same is readily obtainable from other sources.

When it is desired to remove the preparation from the skin one may employ an alcohol or a mixture of alcohol with suitable perfume, cologne, bay leaf extract, or the like, and I prefer to market my product in combination with a wash of this character.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A liquid cosmetic preparation adapted to be applied to the face in a smooth invisible film, comprising about three parts of fresh uncooked albumin and about one and one-half parts by weight of alcohol in the order of seventy percent strength, adapted to preserve said albumin over substantial periods of time without turning the albumin brown or precipitating the same, said mixture being adapted to be spread over the face in a thin film without showing when used in the day time.

2. Preparation as claimed in claim 1, wherein the egg albumin employed is previously filtered through fine cloth to remove solid particles.

VICTORIA GONCAROVA.